(12) United States Patent
Okada et al.

(10) Patent No.: US 9,537,172 B2
(45) Date of Patent: Jan. 3, 2017

(54) SEALED SECONDARY BATTERY AND MANUFACTURING METHOD OF SEALED SECONDARY BATTERY

(71) Applicant: Kabushiki Kaisha Toshiba, Minato-ku (JP)

(72) Inventors: Naotada Okada, Yokohama (JP); Kenta Fukatsu, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 116 days.

(21) Appl. No.: 14/039,064

(22) Filed: Sep. 27, 2013

(65) Prior Publication Data

US 2014/0287300 A1    Sep. 25, 2014

(30) Foreign Application Priority Data

Mar. 22, 2013  (JP) .................................. 2013-059278

(51) Int. Cl.
*H01M 2/08*    (2006.01)
*H01M 10/04*   (2006.01)
(Continued)

(52) U.S. Cl.
CPC ........... *H01M 10/049* (2013.01); *H01M 2/365* (2013.01); *H01M 10/446* (2013.01);
(Continued)

(58) Field of Classification Search
CPC .. H01M 10/049; H01M 10/446; H01M 10/52; H01M 10/38; H01M 10/04; H01M 2/365; H01M 2/0473; H01M 2/36; H01M 2/04; H01M 2/08
See application file for complete search history.

(56) References Cited

U.S. PATENT DOCUMENTS

2008/0160393 A1    7/2008  Kim et al.
2008/0311475 A1*   12/2008 Manev .................. H01M 4/485
                                                             429/231.5
(Continued)

FOREIGN PATENT DOCUMENTS

CN    101933177    12/2010
JP    5-11316 U    2/1993
(Continued)

OTHER PUBLICATIONS

Jeon et al., KR 10-2008-0042966, Method for preparing a prismatic secondary battery capable of removing internal gas of a battery cell to reduce thickness of the battery cell May 16, 2008, Abstract English translation.*
(Continued)

*Primary Examiner* — Patrick Ryan
*Assistant Examiner* — Kiran Akhtar
(74) *Attorney, Agent, or Firm* — Oblon, McClelland, Maier & Neustadt, L.L.P.

(57) ABSTRACT

According to one embodiment, in a manufacturing method of a sealed secondary battery of the embodiment, a first sealing body, which is configured to seal an opening portion of a lid body to cover the opening portion and is formed into a sheet-like shape by using a metal material, is placed on the lid body, and the first sealing body is welded to the lid body. The sealed secondary battery having the first sealing body welded thereto is charged, and the sealed secondary battery is discharged after the charge. A hole is bored in the first sealing body to form a hole portion after the discharge, a second sealing body is placed to cover the first sealing body, and the second sealing body is welded to the lid body through the first sealing body.

8 Claims, 4 Drawing Sheets

(51) Int. Cl.
*H01M 2/36* (2006.01)
*H01M 10/44* (2006.01)
*H01M 10/52* (2006.01)
*H01M 2/04* (2006.01)

(52) U.S. Cl.
CPC .......... *H01M 10/52* (2013.01); *H01M 2/0473* (2013.01); *Y10T 29/4911* (2015.01)

(56) References Cited

U.S. PATENT DOCUMENTS

| | | | |
|---|---|---|---|
| 2010/0024204 A1* | 2/2010 | Min | H01M 10/058 29/623.2 |
| 2011/0027645 A1* | 2/2011 | Komatsuki | H01M 2/08 429/185 |

FOREIGN PATENT DOCUMENTS

| | | | | |
|---|---|---|---|---|
| JP | 11-273638 | | 10/1999 | |
| JP | 2007-35343 | | 2/2007 | |
| JP | 2007-323882 | * | 12/2007 | ............. H01M 2/36 |
| JP | 4128648 B2 | | 7/2008 | |
| JP | 2009-181906 | | 8/2009 | |
| JP | 2009-295595 | | 12/2009 | |
| JP | 2013-229136 | | 11/2013 | |
| JP | 2013-248909 | | 12/2013 | |
| KR | 10-2001-0026868 | | 4/2001 | |
| KR | 10-2008-0042966 | | 5/2008 | |
| KR | 10-2010-0098458 | | 9/2010 | |
| KR | 1020060111356 | * | 4/2011 | ............. H01M 10/38 |

OTHER PUBLICATIONS

Jeon et al., KR 10-2008-0042966, Method for preparing a prismatic secondary battery capable of removing internal gas of a battery cell to reduce thickness of the battery cell, May 16, 2008, Abstract English translation.*
Mori et al., JP2007-323882, Sealed battery and its manufacturing method, Dec. 12, 2007, Abstract English translation.*
English Translation of KR1020060111356.*
English Translation of JP2007-323882.*
Korean Office Action issued Nov. 28, 2014, in Korea Patent Application No. 10-2014-0013629 (with English translation)..
Office Action mailed Nov. 4, 2015 in Chinese Patent Application No. 201410051655.1 (with English Translation).
Korean Office Action issued Nov. 28, 2014, in Korea Patent Application No. 10-2014-0013629 (with English translation).
Office Action mailed Sep. 6, 2016 in Japanese Patent Application No. 2013-059278 (with English translation).

* cited by examiner

SEALED SECONDARY BATTERY AND MANUFACTURING METHOD OF SEALED SECONDARY BATTERY

CROSS-REFERENCE TO RELATED APPLICATIONS

This application is based upon and claims the benefit of priority from Japanese Patent Application No. 2013-059278, filed Mar. 22, 2013, the entire contents of which are incorporated herein by reference.

FIELD

Embodiments described herein relate generally to a sealed secondary battery and a manufacturing method of a sealed secondary battery.

BACKGROUND

As a manufacturing method of a sealed secondary battery, there has been conventionally known the technology that manufactures a sealed secondary battery by accommodating an electrode body in a container, providing an electrolyte in the container, temporality sealing the container, performing charge and discharge, and then fully sealing the container.

For example, in such a sealed secondary battery, a liquid injection opening provided in the container is sealed by using a rubber stopper or the like, and temporal sealing is carried out. Further, in the sealed secondary battery, a gas generated at the time of charge and discharge is discharged from the container by removing the rubber stopper, thereby avoiding deformation and damage of the container. Furthermore, in the sealed secondary battery, the liquid injection opening is sealed by welding a metal lid, and full sealing is effected. Through such a process, the sealed secondary battery is manufactured.

DETAILED DESCRIPTION

In general, according to one embodiment, in a manufacturing method of a sealed secondary battery, a first sealing body, which is configured to seal an opening portion of a lid body to cover the opening portion and is formed into a sheet-like shape by using a metal material, is placed on the lid body of a container of a sealed secondary battery in which an opening of a container main body having an electrode body and an electrolyte arranged therein is closed by the lid body which is formed of a metal material and comprises the opening portion, and the first sealing body is welded to the lid body. The sealed secondary battery having the first sealing body welded thereto is charged, and the sealed secondary battery is discharged after the charge. A hole is bored in the first sealing body to form a hole portion after the discharge, a second sealing body, which is configured to seal the opening portion and the hole portion and formed into a sheet-like shape by using a metal material, is placed to cover the first sealing body, and the second sealing body is welded to the lid body through the first sealing body.

A sealed secondary battery 1 and a manufacturing method of the sealed secondary battery 1 according to this embodiment will now be described hereinafter with reference to FIG. 1 to FIG. 5.

Figure 1:
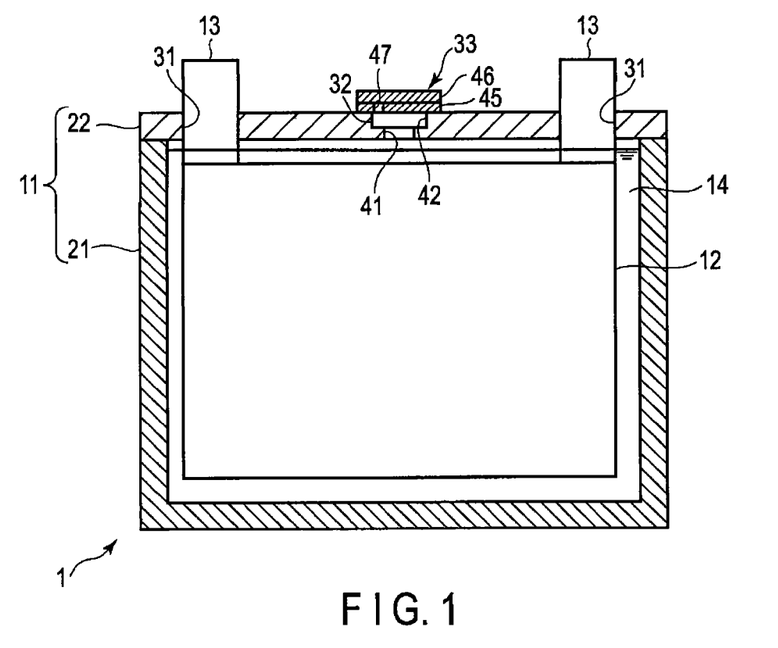
FIG. 1 is a cross-sectional view showing a configuration of a sealed secondary battery according to a first embodiment.
Figure 2:
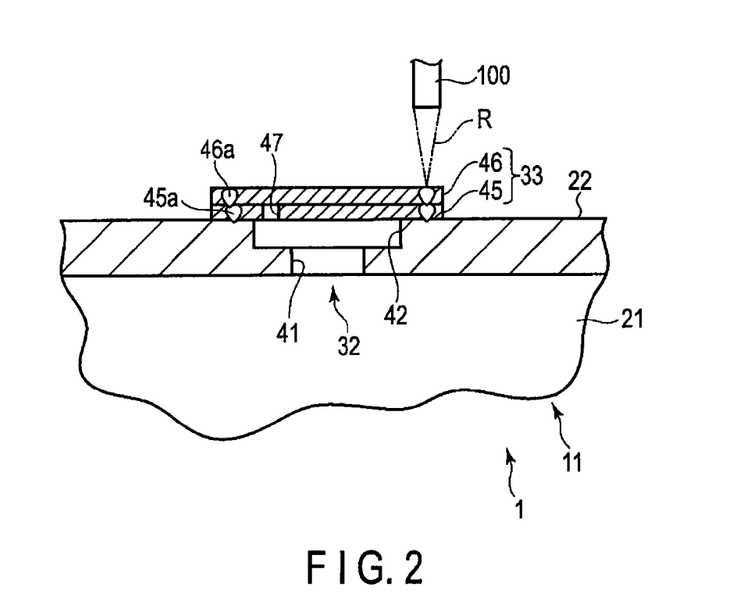
FIG. 2 is a cross-sectional view showing a primary configuration of the sealed secondary battery.
Figure 3:
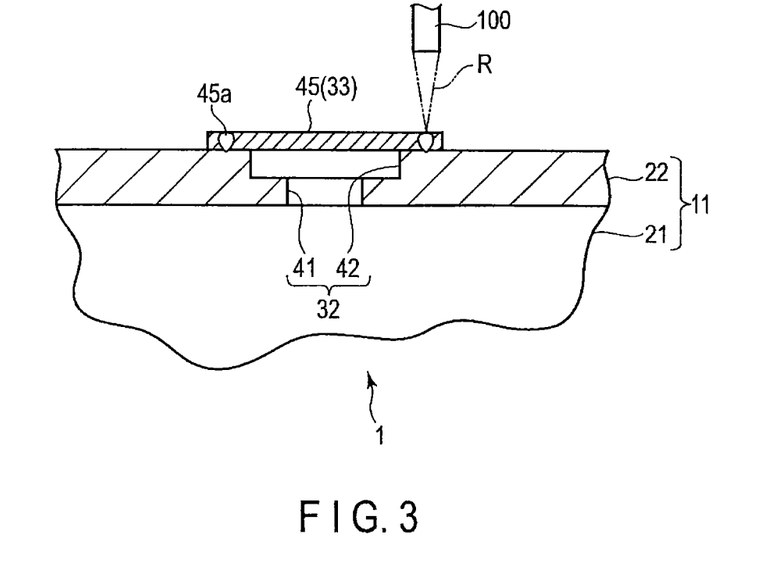
FIG. 3 is a cross-sectional view showing part of a manufacturing method of a sealed secondary battery in a primary configuration.
Figure 4:
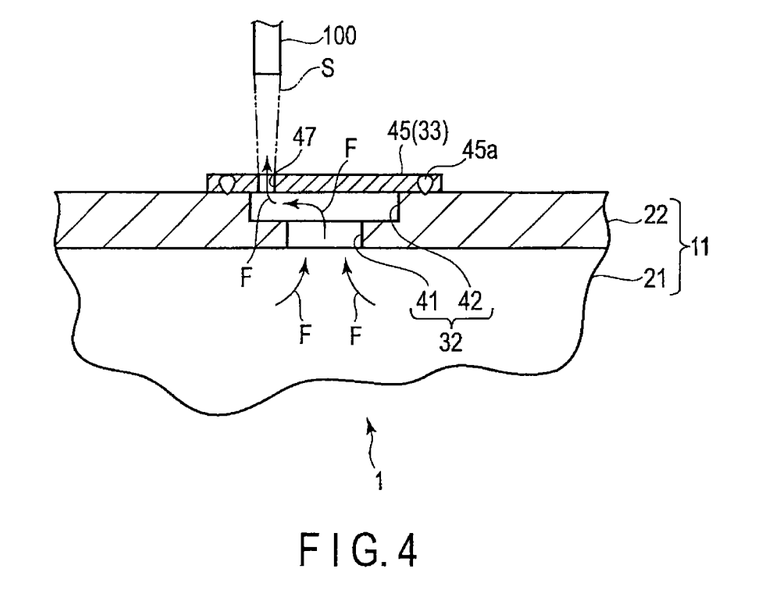
FIG. 4 is a cross-sectional view showing part of the manufacturing method of a sealed secondary battery in a primary configuration.
Figure 5:
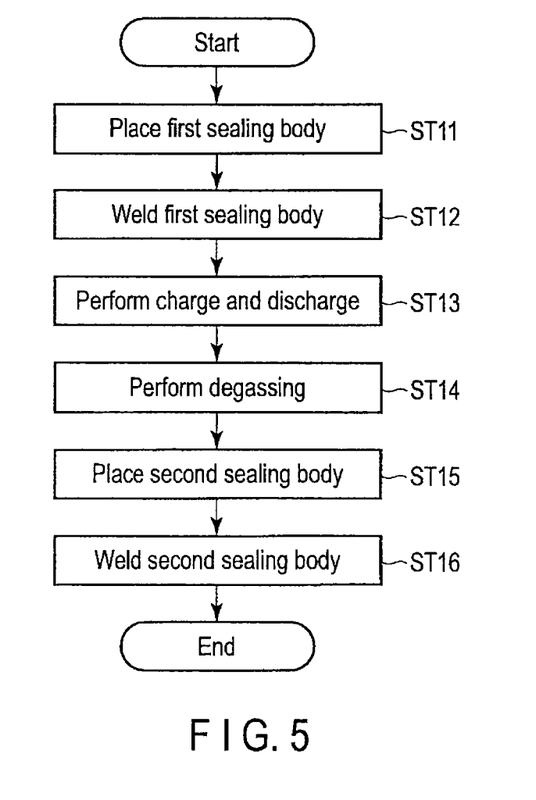
FIG. 5 is a flowchart showing the manufacturing method of a sealed secondary battery.

FIG. 1 is a cross-sectional view showing a configuration of the sealed secondary battery 1 according to a first embodiment, FIG. 2 is a cross-sectional view showing a primary configuration of the sealed secondary battery, which is specifically an opening portion 32 and a sealing structure 33 of a container 11 used in the sealed secondary battery 1, FIG. 3 is a cross-sectional view showing a temporary sealing step which is part of a manufacturing method of the sealed secondary battery by using the opening portion 32 and the sealing structure 33, FIG. 4 is a cross-sectional view showing a degassing step which is part of the manufacturing method of the sealed secondary battery 1 by using the opening portion 32 and the sealing structure, and FIG. 5 is a flowchart showing a manufacturing method of the sealed secondary battery 1.

The sealed secondary battery 1 comprises a container 11 having a sealed inner space, an electrode body 12 provided in the container 11, a pair of electrodes 13 that are connected to the electrode body 12 and protrude to the outside of the container 11, and an electrolyte 14 stored in the container 1.

The container 11 is formed into a box-like shape the inside of which can be hermetically closed. The electrode body 12 and the electrolyte 14 can be arranged in the container 11, and the pair of electrodes 13 can liquid-tightly and air-tightly protrude from the inside of the container 11.

Specifically, the container 11 comprises a box-like container main body 21 that is opened at one end and a lid body 22 that closes the opening of the container main body 21 and hermetically closes the space in the container main body 21. The lid body 22 is made of, e.g., a metal material such as an SUS material or an aluminum material. The lid body 22 comprises a pair of insertion holes 31 into which the pair of electrodes 13 are hermetically inserted, an opening portion 32 that communicates with the inner space of the container 11, and a sealing structure 33 that seals the opening portion 32.

The opening portion 32 is a circular opening provided in the lid body 22. Specifically, the opening portion 32 is formed into a so-called two-level shape based on two different diameters. The opening portion 32 comprises a first opening portion 41 and a second opening portion 42 formed with a larger diameter than the first opening portion 41.

The first opening portion 41 is formed on an inner surface side of the lid body 22, i.e., a main surface side of the lid body 22 placed on the inner space side of the container 11. That is, the first opening portion 41 is arranged to face the opening of the container main body 21. The second opening portion 42 is formed on an outer surface side of the lid body 22.

The sealing structure 33 comprises a first sealing body 45 that covers the opening portion 32 and a second sealing body 46 laminated on the first sealing body 45. The sealing structure 33 is formed so that it can hermetically close the inner space of the container by closing the opening portion 32.

The first sealing body 45 is formed into a thin plate-like shape which is specifically a sheet-like discoid shape made of a metal material that can be welded to the lid body 22. For example, the first sealing body 45 is formed into a flat shape. The first sealing body 45 is formed with a thickness of, e.g., 0.3 mm. The first sealing body 45 is formed with an outer diameter that is larger than the second opening portion 42 of the opening portion 32.

The first sealing body 45 is welded to the lid body 22 at a welding portion 45a on an outer peripheral edge side thereof, and it seals the opening portion 32. That is, the first sealing body 45 is formed into a shape that has an outer diameter larger than the second opening portion 42 and can assure a weld where the welding portion 45a which is to be welded to the lid body 22 is formed. When a hole is bored in part of the first sealing body 45 welded to the lid body 22, a hole portion 47 is formed.

The second sealing portion 46 is formed into a thin plate-like shape, which is specifically a sheet-like discoid shape made of a metal material that can be welded to the lid body 22 and the first sealing body 45. For example, the second sealing body 46 is formed into a flat shape. The second sealing body 46 is formed with an outer diameter that is larger than the second opening portion 42 of the opening portion 32.

The second sealing body 46 is welded to the lid body 22 at a welding portion 46a on an outer peripheral edge side thereof through the first sealing body 45, and it seals the opening portion 32. That is, the second sealing body 46 is formed into a shape that has an outer diameter larger than the second opening portion 42 and can assure a weld where the welding portion 46a which is to be welded to the lid body 22 is formed.

For example, when the second sealing body 46 is welded to the first sealing body 45 welded to the lid body 22, it is fixed to the lid body 22. It is to be noted that the second sealing body 46 may be configured to be welded to the lid body 22 and the first sealing body 45. The second sealing body 46 is made of the same material as the first sealing body 45, and it is formed into the same shape as the first sealing body 45.

The electrode body 12 is a so-called wound electrode body formed by, e.g., laminating sheet-shaped positive electrode sheet and negative electrode sheet through a division layer and winding these electrode sheets. The pair of electrodes 13 are electrically connected to the electrode body 12, and they are formed to protrude from the lid body 2 to the outside of the container 11. In the pair of electrodes 13, one constitutes a positive electrode terminal, and the other constitutes a negative electrode terminal.

A manufacturing method of the thus configured sealed secondary battery 1 will now be described with reference to FIG. 2 to FIG. 5.

First, the electrolyte 14 is injected from the opening portion 32 of the container 11 in which the electrode body 12 and the electrolyte 14 are arranged, and the electrolyte 14 is stored in the container 11.

Then, the first sealing body 45 is mounted on the opening portion 32 of the lid body 22 to cover the opening portion 32 with use of a carrying apparatus that can pick the first sealing body 45 (a step ST11). At this time, the first sealing body 45 is mounted on the lid body 22 so that a weld which is welded to the lid body 22 can be assured at an outer peripheral edge thereof.

Subsequently, as shown in FIG. 3, the first sealing body 45 is welded to the lid body 22 with use of a welding apparatus 100 (a step ST12). It is to be noted that the welding apparatus 100 has a high output and is configured to output a laser beam R that can melt the lid body 22, the first sealing body 45, and the second sealing body 45. When the first sealing body 45 is welded to the lid body 22, the opening portion 32 of the container 11 is temporarily sealed. Then, the sealed secondary battery 1 having the temporarily sealed opening portion 32 is charged, and the charged sealed secondary battery 1 is discharged after end of charge (a step ST13).

After end of charge and discharge, a hole is bored in the first sealing body 45 by using a boring apparatus 110 to form a hole portion 47, and a gas generated from the electrolyte 14 filling the container 11 is discharged (a step ST14). For example, the boring apparatus 110 has a high output, and it is formed so that an irradiation position of the first sealing body 45 can be irradiated with a laser beam S that enables melting.

As shown in FIG. 4, part of a range of the opening portion 32 of the first sealing body 45 that faces a portion between an inner peripheral surface of the first opening portion 41 and an inner peripheral surface of the second opening portion 42 is irradiated with the laser beam S. The irradiation position of the first sealing body 45 irradiated with the laser beam S is molten and opened, and the hole portion 47 is thereby formed. Moreover, when the hole portion 47 is formed, the gas in the container 11 sequentially passes through the first opening portion 41, the second opening portion 42, and the hole portion 47 and moves to the outside like a gas flow F indicated by an arrow in FIG. 4, thereby degassing the container 11.

At this time, the first sealing body 45 molten by irradiation of the laser beam S is cooled by heat conduction. Further, although part of the molten first sealing body 45 is separated from the first sealing body 45, the separated part of the first sealing body 45 moves to the outside of the lid body 22 through the gas flow F. It is to be noted that, even if the part of the first sealing body 45 separated from the first sealing body 45 when molten falls by gravity without moving to the outside, the molten first sealing body 45 that has fallen moves to an end face of the second opening portion 42, is again solidified, and thereby received by the second opening portion 42.

Then, the second sealing body 46 is carried by the carrying apparatus, and the second sealing body 46 is placed on the first sealing body 45 (a step ST15). At this time, the second sealing body 46 is placed on the first sealing body 45 so that a weld that is welded to the lid body 22 through the first sealing body 45 can be assured at the outer peripheral edge of the second sealing body 46.

Subsequently, as shown in FIG. 2, the weld of the second sealing body 46 is irradiated with the laser beam R by using the welding apparatus 100, and the second sealing body 46 is welded to the lid body 22 (a step ST16). As a result, since the hole portion 47 is sealed with the second sealing body 46, the opening portion 32 is completely sealed, and the container 11 is hermetically closed. The sealed secondary battery 1 is manufactured through these steps.

According to the thus configured sealed secondary battery 1, in regard to temporary sealing and full sealing of the container 11, the sealing structure 33 may have a simple configuration that the first sealing body 45 and the second sealing body 46 are welded to the lid body 22 and the opening portion 32 is closed. Further, degassing from the charged and discharged sealed secondary battery 1 may have a simple configuration that the first sealing body 45 is welded and then the first sealing body 45 is irradiated with the laser beam S to bore a hole in the first sealing body 45, thereby forming the hole portion 47.

Furthermore, since the first sealing body 45 having the hole formed therein is configured to close the opening portion 32 and the hole portion 47 of the first sealing body 45 when it is covered with the second sealing body 46, a step of removing the first sealing body 45 is not necessary, and manufacturing steps can be reduced.

That is, the opening portion 32 does not have to be closed by a member such as detachable plug and this member does not have to be removed, and hence a manufacturing cost can be reduced. Moreover, when the first sealing body 45 has the same shape as, e.g., the second sealing body 46, the number of components can be reduced. When such a sealing structure 33 is used, a manufacturing cost of the sealed secondary battery 1 can be decreased.

Additionally, in the sealed secondary battery 1, the opening portion 32 is constituted of the first opening portion 41 and the second opening portion 42 having a larger diameter than the first opening portion 41. Further, the sealed secondary battery 1 has a configuration that the hole is bored in the first sealing body 45 in the range between an inner peripheral surface of the first opening portion 41 and an inner peripheral surface of the second opening portion 42, i.e., at a position facing an end face of the second opening portion 42.

With such a configuration, in the sealed secondary battery 1, since the range of the end face of the second opening portion 42 is irradiated with the laser beam S emitted from the boring apparatus 110, the inside of the container 11 can be prevented from being irradiated with the laser beam S. As a result, the laser beam S can be prevented from affecting the configuration in the container 11, and reliability of the sealed secondary battery 1 can be improved.

Moreover, after forming the hole in the first sealing body 45, as indicated by the gas flow F, the gas flows from the inside to the outside of the container 11, and hence the part of the first sealing body 45 separated by boring can be prevented from entering the container 11.

Additionally, even if the part of the first sealing body 45 separated by boring enters the container 11, the molten and separated part of the first sealing body 45 can be received by the end face of the second opening portion 42. That is, the molten and separated part of the first sealing body 45 abuts on the end face of the second opening portion 42 and is solidified, and hence the separated part of the first sealing body 45 can be prevented from entering the container 11. As a result, the reliability of the sealed secondary battery 1 can be improved.

As described above, according to the sealed secondary battery 1 of this embodiment, the opening portion 32 is temporarily sealed by welding the first sealing body 45, the hole is bored in the first sealing body 45, the gas in the container 11 is discharged to the outside, the gas readily generated by temporary sealing and charge/discharge can be easily discharged by closing the hole portion 47 of the first sealing body 45 with the second sealing body 45.

As another embodiment of the first sealing body 45 and the second sealing body 46 used in the sealed secondary battery 1, a second embodiment will be described with reference to FIG. 6 and FIG. 7 and a third embodiment will be described with reference to FIG. 8 hereinafter.

Figure 6:
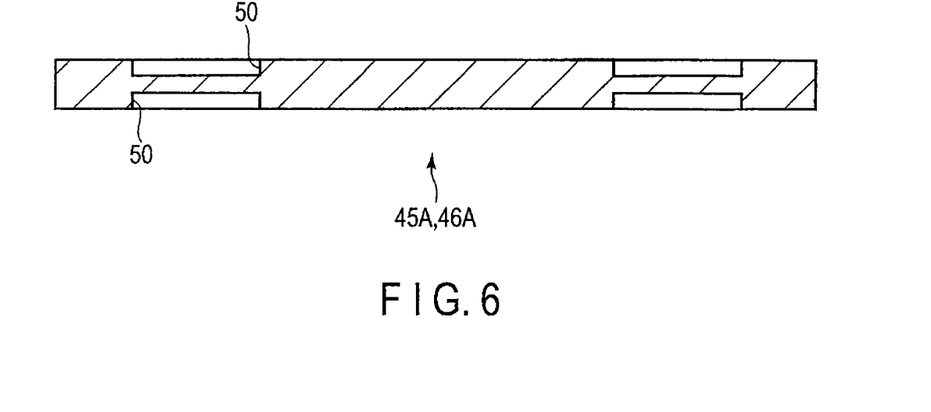
FIG. 6 is a cross-sectional view showing a configuration of a lid body used in a sealed secondary battery according to a second embodiment.
Figure 7:
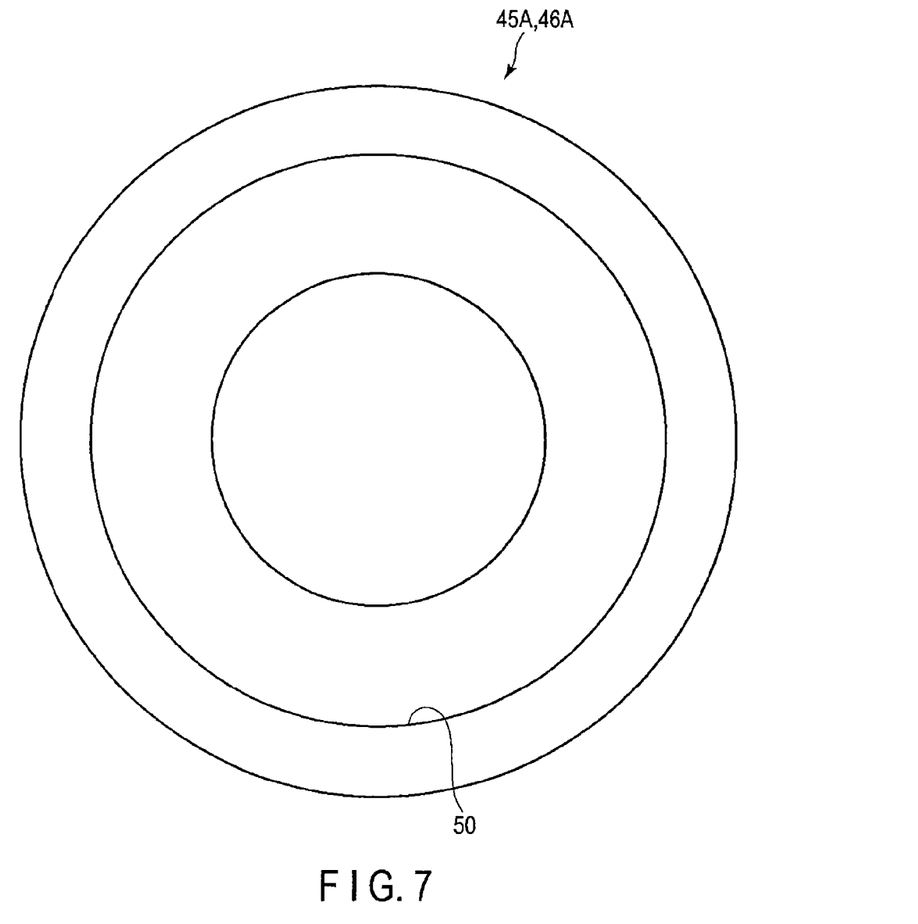
FIG. 7 is a plan view showing a configuration of the lid body.

FIG. 6 is a cross-sectional view showing a configuration of each of a first sealing body 45A and a second sealing body 46A used in a sealing structure 33 of a sealed secondary battery 1 according to the second embodiment, and FIG. 7 is a plan view showing a configuration of each of the first sealing body 45A and the second sealing body 46A.

It is to be noted that, in FIG. 6 and FIG. 7, the first sealing body 45A and the second sealing body 46A will be described by using the same drawing. Further, the sealed secondary battery 1 according to the second embodiment has the same configuration as the sealed secondary battery 1 according to the first embodiment except the configuration of each of the sealing body 45A and the second sealing body 46A, and hence a detailed description of structures other than the first sealing body 45A and the second sealing body 46A will be omitted in FIG. 6 and FIG. 7.

The first sealing body 45A and the second sealing body 46A used in the sealing structure 33 of the sealed secondary battery 1 according to the second embodiment is made of metal materials that can be welded to a lid body 22 and can be also welded to each other. Each of the first sealing body 45A and the second sealing body 46A is formed into a sheet-like discoid shape and has an annular groove portion 50 in part thereof.

The groove portion 50 is formed in the range facing an end face of a second opening portion 41 placed between an inner peripheral surface of a first opening portion 41 and an inner peripheral surface of a second opening portion 42 of an opening portion 32 when each of the first sealing body 45A and a second sealing body 46A is placed on and welded to the lid body 22. As the groove portion 50, a thin-wall portion is formed by reducing a thickness of part of each of the first sealing body 45A and the second sealing body 46A to be smaller than other portions. For example, the groove portion 50 is formed with a thickness of 0.05 mm when each of the first sealing body 45A and the second sealing body 46A is formed with a thickness of 0.3 mm.

Furthermore, the groove portion 50 is formed on one side or both sides of the first sealing body 45A. This groove portion 50 is provided in the range where a hole is bored in the first sealing body 45A by a boring apparatus 110.

According to the sealed secondary battery 1 comprising the sealing structure 33 using the thus configured first sealing body 45A and second sealing body 46A, a gas readily generated by temporary sealing and charge/discharge can be easily discharged like the sealed secondary battery 1 according to the first embodiment. Moreover, in the first sealing body 45A, since a hole is bored in part of the groove portion 50, a volume of part of the first sealing body 45A separated by melting can be reduced when a hole portion 47 is formed. As a result, it possible to avoid contamination or the like due to part of the first sealing body 45A separated by boring as much as possible.

Figure 8:
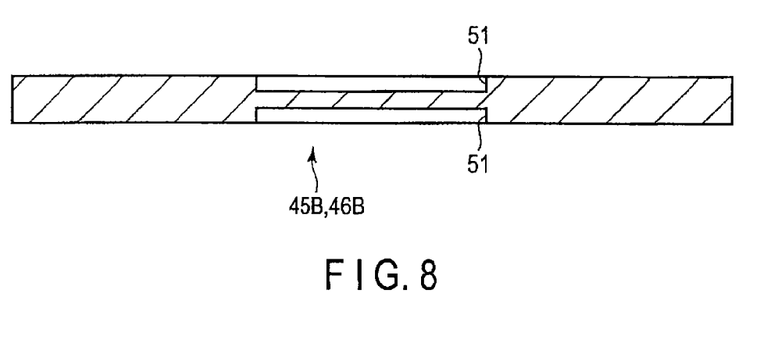
FIG. 8 is a cross-sectional view showing a configuration of a lid body used in a sealed secondary battery according to a third embodiment.

FIG. 8 is a cross-sectional view showing a configuration of each of a first sealing body 45B and a second sealing body 46B used in a sealing structure 33 of a sealed secondary battery 1 according to a third embodiment. It is to be noted that, in FIG. 8, each of the first sealing body 45B and the second sealing body 46B will be explained by using the same drawing. Additionally, the sealed secondary battery 1 according to the third embodiment has the same configuration as those of the sealed secondary batteries 1 according to the first embodiment and the second embodiment except configurations of the first sealing body 45B and the second sealing body 46B, a detailed description of structures other than the first sealing body 45B and the second sealing body 46B in FIG. 8 will be omitted.

The first sealing body 45B and the second sealing body 46B used in the sealing structure 33 of the sealed secondary battery 1 according to the third embodiment are made of metal materials that can be welded to a lid body 22 and can be also welded to each other. Each of the first sealing body 45B and the second sealing body 46B is formed into a sheet-like discoid shape and has an annular groove portion 51 provided at the center thereof.

The groove portion 51 is formed at a position facing a first opening portion 41 of an opening portion 32 when each of the first sealing body 45B and the second sealing body 46B is mounted on and welded to a lid body 22. As the groove portion 51, a thin-wall portion is formed by reducing a thickness of part of each of the first sealing body 45B and the second sealing body 46B. For example, the groove portion 51 is formed with a thickness of 0.05 mm when each of the first sealing body 45B and the second sealing body 46B is formed with a thickness of 0.3 mm.

Further, the groove portion 51 is formed on one side or both sides of the first sealing body 45B. This groove portion 51 corresponds to the range where a hole is bored in the first sealing body 45B by a boring apparatus 110.

According to the thus configured sealed secondary battery 1 of the third embodiment, like the sealed secondary batteries of the first embodiment and the second embodiment, a gas readily generated by temporal sealing and charge/discharge can be easily discharged. Furthermore, the groove portion 51 enables reducing a volume of a region of the first sealing body 45B in which a hole is bored by the boring apparatus 110. As a result, even if a position where a hole is formed above the first opening portion 41, i.e., a position where a hole portion 47 is provided is placed above the first opening portion 32, reducing a volume of part of the first sealing body 45B separated by melting enables preventing the separated part of the first sealing body 45B from entering a container 11.

Furthermore, when the volume of the part of the first sealing body 45B separated by melting is reduced, part of the first sealing body 45B is affected by a gas pressure in the container 11, it is assuredly moved to the outside, and hence the part of the first sealing body 45B does not enter the container 11. As a result, the reliability of the sealed secondary battery 1 can be improved. Moreover, a flow path from the inside to the outside of the container 11 becomes a linear flow path through the first opening portion 41 and the second opening portion 42, thereby enabling efficient degassing.

It is to be noted that the sealed secondary battery 1 and the manufacturing method of the sealed secondary battery 1 are not restricted to the configurations of the respective foregoing embodiments. For instance, although the configurations using the first sealing bodies 45, 45A, and 45B and the second sealing bodies 46, 46A, and 46B having the same shape have been explained in the above examples, the present invention is not restricted thereto.

For example, the sealing structure 33 may be configured to use the first sealing body 45A or 45B having the groove portion 50 formed thereon as the first sealing body in which a hole is formed by the boring apparatus 10 and use the second sealing body 46 having the flat shape as the second sealing body. Additionally, although the sealing structure 33 uses the flat first sealing body 45 and second sealing body 46, it may be configured to reduce a volume of part of the first sealing body 45 that is separated at the time of forming a hole by reducing the thickness of the first sealing body 45 to be smaller than the thickness of the second sealing body 46.

Further, as the boring apparatus 110, the configuration that the hole portion 47 is formed in the first sealing body 45, 45A, or 45B by applying the laser beam S has been described in the above examples, but the present invention is not restricted thereto. For example, the boring apparatus 110 may have a configuration that the hole portion 47 is formed by boring using a boring member S such as a needle S which physically fractures the first sealing body 45, 45A, or 45B in place of the laser beam S and a gas is discharged from the hole portion 47. Furthermore, in the above examples, the thicknesses of the first sealing body 45, 45A, or 45B and the second sealing body 46, 46A, or 46B have been exemplified and explained, but detailed thicknesses can be appropriately set as long as these thicknesses are not broken by an inner pressure of the container 11 without being restricted thereto.

Moreover, in the above examples, the configuration that the opening portion 32 is constituted of the first opening portion 41 and the second opening portion 42 having different diameters has been described, but the present invention is not restricted thereto, and the opening portion 32 may be formed of the first opening portion 41 alone in case of using the first sealing body 45A or 45B having the groove portion 50 or 51. However, it is preferable to provide the first opening portion 41 and the second opening portion 42 and form a hole in the first sealing body 45 or 45A at a position facing the end face of the second opening portion 42.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a sealed secondary battery, comprising:

placing a first sealing body, which is configured to seal an opening portion of a lid body to cover the opening portion and is formed into a sheet-like shape by using a metal material, on the lid body of a container of a sealed secondary battery in which an opening of a container main body having an electrode body and an electrolyte arranged therein is closed by the lid body which is formed of a metal material and comprises the opening portion;

welding the first sealing body to the lid body;

charging the sealed secondary battery having the first sealing body welded thereto;

discharging the sealed secondary battery after the charging;

boring a hole in the first sealing body to form a hole portion after the discharging;

placing a second sealing body, which is configured to seal the opening portion and the hole portion and formed into a sheet-like shape by using a metal material, to cover the first sealing body; and welding the second sealing body to the lid body through the first sealing body, wherein the opening portion comprises a first opening portion formed on a container main body side of the lid body and a second opening portion formed with a larger diameter than the first opening portion, and the hole portion is bored through the first sealing body between an inner peripheral surface of the first opening portion and an inner peripheral surface of the second opening portion.

2. The method according to claim 1, wherein the hole portion is formed by irradiating the first sealing body with a laser beam.

3. The method according to claim 1, wherein the hole portion is formed of a boring member that fractures the first sealing body.

4. The method according to claim 1, wherein a thin-wall portion thinner than other portions is formed in the region of the first sealing body where the hole is formed.

5. A sealed secondary battery comprising:
a container main body which is partly opened;
a lid body which is made of a metal material, comprises a first opening portion facing the container main body and a second opening portion formed with a larger diameter than the first opening portion, and closes the opening of the container main body;
an electrode body arranged in the container main body;
an electrode connected to the electrode body;
an electrolyte stored in the container main body;
a first sealing body which is formed into a sheet-like shape by using a metal material, welded to the lid body to cover the second opening portion, and includes a hole portion through the first sealing body formed at a position facing the first opening portion or the second opening portion; and
a second sealing body which is formed into a sheet-like shape, welded to the first sealing body to cover the first sealing body, and seals the opening portion,
wherein the hole portion is formed between an inner peripheral surface of the first opening portion and an inner peripheral portion of the second opening portion.

6. The sealed secondary battery according to claim 5, wherein a thin-wall portion thinner than other portions is formed in a region of the first sealing body where the hole portion is provided.

7. The sealed secondary battery according to claim 5, wherein the hole portion is formed by using a laser beam after the first sealing body is welded to the lid body.

8. The sealed secondary battery according to claim 5, wherein the hole portion is formed by using a boring member that fractures the first sealing body after the first sealing body is welded to the lid body.

* * * * *